(12) United States Patent
Shuai

(10) Patent No.: US 11,151,688 B1
(45) Date of Patent: Oct. 19, 2021

(54) IMAGE PROCESSING METHOD FOR SCREEN INNER HOLE OF DISPLAY DEVICE

(71) Applicant: WUHAN CHINA STAR OPTOELECTRONICS TECHNOLOGY CO., LTD., Hubei (CN)

(72) Inventor: Chuan Shuai, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 351 days.

(21) Appl. No.: 16/476,945

(22) PCT Filed: Apr. 19, 2019

(86) PCT No.: PCT/CN2019/083416
§ 371 (c)(1),
(2) Date: Jul. 10, 2019

(87) PCT Pub. No.: WO2020/181616
PCT Pub. Date: Sep. 17, 2020

(30) Foreign Application Priority Data

Mar. 8, 2019 (CN) .......................... 201910176955.5

(51) Int. Cl.
*G06T 3/40* (2006.01)
*G06T 7/00* (2017.01)

(52) U.S. Cl.
CPC .......... *G06T 3/4007* (2013.01); *G06T 7/0002* (2013.01)

(58) Field of Classification Search
None
See application file for complete search history.

(56) References Cited

U.S. PATENT DOCUMENTS

| 4,876,728 A * | 10/1989 | Roth .................... G06K 9/34 |
| | | 382/153 |
| 10,429,905 B2 * | 10/2019 | Lee ....................... G06F 1/1639 |
| 10,671,258 B2 * | 6/2020 | Lee ....................... G06F 3/04842 |
| 11,023,001 B2 * | 6/2021 | Lim ...................... G06F 3/0412 |
| 2018/0017996 A1 * | 1/2018 | Ryu ...................... G06F 1/1647 |
| 2018/0121067 A1 * | 5/2018 | Lee ...................... G06F 3/04842 |
| 2020/0026335 A1 | 1/2020 | Lee et al. |

(Continued)

FOREIGN PATENT DOCUMENTS

| CN | 107864299 A | 3/2018 |
| CN | 107943551 A | 4/2018 |

(Continued)

*Primary Examiner* — James A Thompson

(57) ABSTRACT

An image processing method for a screen inner hole of a display device is provided, including steps as follows: determining coordinates at a center and a radius r of the screen inner hole, and drawing a circle with the radius r to obtain a pixel range of an inner hole area, and calculating a pixel variance of the pixel range; analyzing an image configuration in the inner hole area and a peripheral area around the inner hole area, and determining whether key information is in the inner hole area; locating and determining a range of the inner hole area and a range of the peripheral area; and separately calculating, in the inner hole area and in the peripheral area, a pixel mean and a pixel variance.

16 Claims, 4 Drawing Sheets

(56) References Cited

U.S. PATENT DOCUMENTS

2020/0042038 A1* 2/2020 Lim .................... H04N 5/2257
2020/0292413 A1* 9/2020 Kim .................... G01B 11/272

FOREIGN PATENT DOCUMENTS

| CN | 107967129 A | 4/2018 |
| CN | 108024009 A | 5/2018 |
| CN | 108200245 A | 6/2018 |
| WO | 2018012719 A1 | 1/2018 |

* cited by examiner

IMAGE PROCESSING METHOD FOR SCREEN INNER HOLE OF DISPLAY DEVICE

1. FIELD OF DISCLOSURE

The present invention relates to a field of display devices and in particular, to an image processing method for a screen inner hole of a display device.

2. DESCRIPTION OF RELATED ART

With development of an entire design of smartphones, consumers demand more for aesthetics. As a result, smartphone screens have trended from a diversified design to a full screen design to give consumers a better visual experience and a more fashionable-looking smartphone. Therefore, full-screen designs, such as chip on film (COF), ultra-narrow bezels, notches (special-shaped screens), and related manufacturing technology have been upgraded in a short period of time. A screen ratio has gradually increased from 80% to 97%. However, problems with a front camera still need to be solved. At present, there are bottlenecks for further increasing the screen ratio, so industries come up with a screen inner hole boring technique. The screen inner hole boring technique can further increase the screen ratio, and allows the front camera to be placed at any position, thereby improving aesthetics of the entire design of the smartphone. However, the screen inner hole boring technique has a problem of failing to display an image properly in a screen inner hole, and in some cases, a strange image may appear. For example, some key information does not appear in the screen inner hole, causing missing information.

SUMMARY

In conventional screen inner hole boring techniques, there is a problem of failing to display an image properly in a screen inner hole, and in some cases, a strange image may appear. For example, some key information is not appearing in the screen inner hole, causing missing information.

The present invention is directed to providing an image processing method for a screen inner hole of a display device, whereby when key information should be missing because it is located in an inner hole area (the screen inner hole), the key information can be displayed normally in a display area, thus making an image more complete and harmonious.

Accordingly, the present invention provides an image processing method for a screen inner hole of a display device, comprising steps as follows:

S10: determining coordinates (i, j) at a center and a radius r of the screen inner hole, and drawing a circle with the radius r to obtain a pixel range of an inner hole area, and calculating a pixel variance of the pixel range;

S20: analyzing an image configuration in the inner hole area and a peripheral area around the inner hole area, and determining whether key information is in the inner hole area;

S30: locating and determining a range of the inner hole area and a range of the peripheral area; and S40: separately calculating, in the inner hole area and in the peripheral area, a pixel mean and a pixel variance, and determining, by pixel values in the inner hole area and the peripheral area, whether the key information is in the inner hole area, wherein when the pixel variance of the inner hole area is larger than a product of a pixel variance of the peripheral area and a coefficient k, it is determined that the inner hole area comprises the key information which is required for image processing, and if it is determined that the inner hole area excludes the key information, an original image is maintained.

According to one embodiment of the present invention, a calculation equation in step S40 is as follows:

$$V_{Area} = \frac{1}{r^2} \sum_{i \in Area} \sum_{j \in Area} (Img(i, j) - \text{Mean})^2$$

$$\text{Mean} = \frac{1}{r^2} \sum_{i \in Area} \sum_{j \in Area} Img(i, j)$$

wherein the inner hole area and the peripheral area are brought into the above calculation equation separately to calculate the pixel means and the pixel variations in the inner hole area and the peripheral area, wherein the Mean in the above calculation equation stands for the pixel means.

According to one embodiment of the present invention, in step S40, the coefficient k is a value greater than one.

According to one embodiment of the present invention, in step S30, locating and determining a range of the inner hole area and a range of the peripheral area comprises inputting the i, j, and r.

According to one embodiment of the present invention, when the inner hole area comprises the key information which is required for image processing, the image processing comprises steps as follows:

S401: analyzing the original image, performing image interpolation on a plurality of pixels in the inner hole area, and making an interpolation width equal to a diameter of the inner hole area, wherein the image interpolation is bilinear interpolation or Lanczos interpolation; and S402: subtracting the interpolation width from a plurality of pixels away from the inner hole area, so as to maintain image resolution, wherein an interframe interpolation technique is adopted to ensure a smooth transition of an image.

According to one embodiment of the present invention, when image information of the inner hole area and image information of the peripheral area are the same, it is determined that the inner hole area excludes the key information, and therefore the original image is maintained; when the image information of the inner hole area and the image information of the peripheral area are different, it is determined that the inner hole area comprises the key information, and therefore the image processing is performed on the key information.

According to another broad-sense embodiment of the present invention, an image processing method for a screen inner hole of a display device is provided, comprising steps as follows:

S10: determining coordinates (i, j) at a center and a radius r of the screen inner hole, and drawing a circle with the radius r to obtain a pixel range of an inner hole area, and calculating a pixel variance of the pixel range;

S20: analyzing an image configuration in the inner hole area and a peripheral area around the inner hole area, and determining whether key information is in the inner hole area;

S30: locating and determining a range of the inner hole area and a range of the peripheral area; and S40: determining, by pixel values in the inner hole area and the peripheral area, whether the key information is in the inner hole area, wherein when it is determined that the inner hole area comprises the key information, image processing is performed on the key information, and if it is determined that the inner hole area excludes the key information, an original image is maintained.

According to one embodiment of the present invention, step S40 further comprises separately calculating, in the inner hole region and the peripheral region, a pixel mean and a pixel variance, wherein the pixel values comprise the pixel means and the pixel variances, wherein when the pixel variance of the inner hole area is larger than the product of the pixel variance of the peripheral area and a coefficient k, it is determined that key information which is required for image processing is in the inner hole area, and if it is determined that the inner hole area excludes the key information, the original image is maintained.

According to one embodiment of the present invention, a calculation equation in step S40 is as follows:

$$V_{Area} = \frac{1}{r^2} \sum_{i \in Area} \sum_{j \in Area} (Img(i, j) - \text{Mean})^2$$

$$\text{Mean} = \frac{1}{r^2} \sum_{i \in Area} \sum_{j \in Area} Img(i, j)$$

wherein the inner hole area and the peripheral area are brought into the above calculation equation separately to calculate the pixel means and the pixel variations in the inner hole area and the peripheral area, wherein the Mean in the above calculation equation stands for the pixel means.

According to one embodiment of the present invention, in step S40, the coefficient k is a value greater than one.

According to one embodiment of the present invention, in step S30, locating and determining a range of the inner hole area and a range of the peripheral area comprises inputting the i, j, and r.

According to one embodiment of the present invention, when the inner hole area comprises the key information which is required for image processing, the image processing comprises steps as follows:

S401: analyzing the original image, performing image interpolation on a plurality of pixels in the inner hole area, and making an interpolation width equal to a diameter of the inner hole area; and

S402: subtracting the interpolation width from a plurality of pixels away from the inner hole area, so as to maintain image resolution, wherein an interframe interpolation technique is adopted to ensure a smooth transition of an image.

According to one embodiment of the present invention, in step S401, the image interpolation is bilinear interpolation or Lanczos interpolation.

According to one embodiment of the present invention, when image information of the inner hole area and image information of the peripheral area are the same, it is determined that the inner hole area excludes the key information, and therefore the original image is maintained; when the image information of the inner hole area and the image information of the peripheral area are different, it is determined that the inner hole area comprises the key information, and therefore the image processing is performed on the key information.

According to one embodiment of the present invention, the display device is a liquid crystal display (LCD) device, an organic light emitting diode (OLED) display device, or a white-light organic light-emitting diode (WOLED) display device.

According to one embodiment of the present invention, a front image sensor is disposed in the screen inner hole, and the front image sensor is a charge coupled device, a complementary metal oxide semiconductor, and an infrared sensor.

The present invention also has the following advantages. In the present invention, through image processing, the display device having the screen inner hole (a bored hole) can display the key information of the image that cannot be displayed at the bored hole by displaying the key information in the display area. Furthermore, through the image processing method of display device of the present invention, the screen inner hole can be placed at any position, thereby effectively improving a screen ratio and aesthetic of the whole design of a smartphone.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work or paying the premise.

DETAILED DESCRIPTION OF EMBODIMENTS

References to "embodiment" in the detailed description mean that the specific features, structures or characteristics described in connection with the embodiment may be included in at least one embodiment of the invention. The same terms mentioned in different places in the specification are not necessarily limited to the same embodiment, but should be understood as an independent embodiment or alternative embodiments to other embodiments. In view of the technical solutions disclosed in the embodiments of the present invention, those skilled in the art should understand that the embodiments described herein may be modified or combined with other technical solutions based on the concepts of the present invention.

Figure 1:
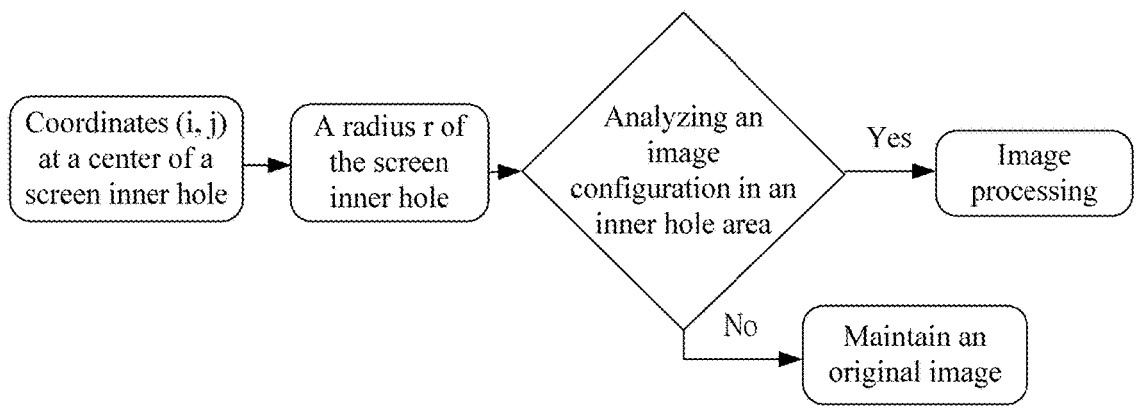
FIG. 1 is a process flow diagram illustrating an image processing method for a screen inner hole of a display device according to the present invention.
Figure 2:
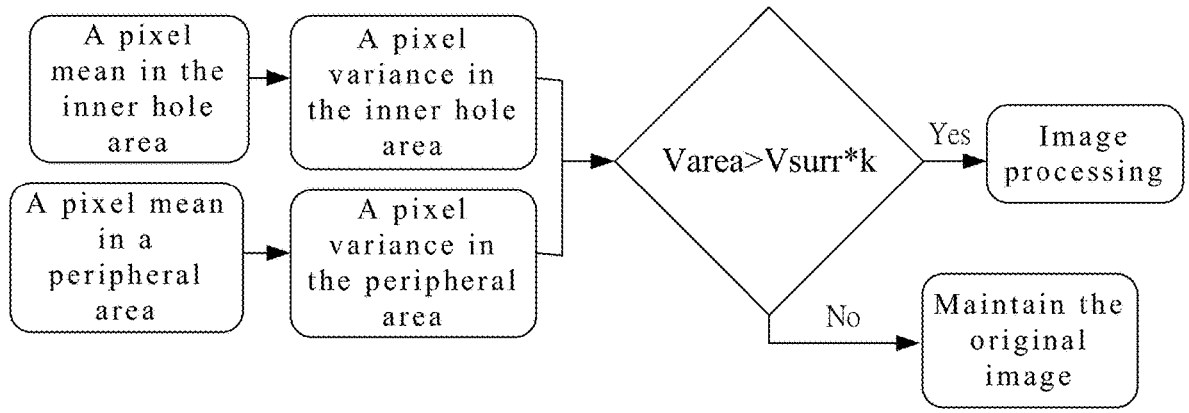
FIG. 2 is another process flow diagram illustrating the image processing method for the screen inner hole of the display device according to the present invention.
Figure 3:
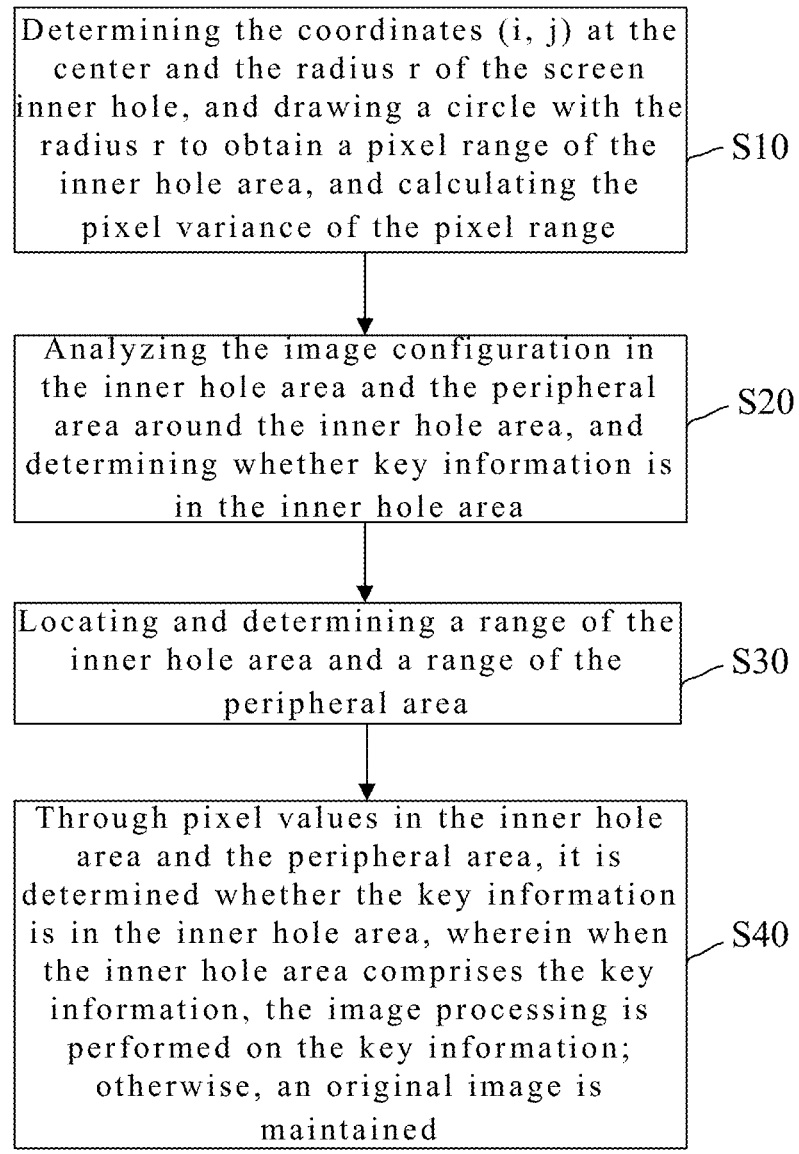
FIG. 3 is still another process flow diagram illustrating the image processing method for the screen inner hole of the display device according to the present invention.

Please refer to FIGS. 1 to 3, which are process flow diagrams illustrating an image processing method for a screen inner hole of a display device. As shown in the drawings, the image processing method for the screen inner hole of the display device comprises steps as follows:

S10: determining coordinates (i, j) at a center and a radius r of the screen inner hole, and drawing a circle with the radius r to obtain a pixel range of an inner hole area, and calculating a pixel variance of the pixel range;

S20: analyzing an image configuration in the inner hole area and a peripheral area around the inner hole area, and determining whether key information is in the inner hole area;

S30: locating and determining a range of the inner hole area and a range of the peripheral area; and S40: separately calculating, in the inner hole area and in the peripheral area, a pixel mean and a pixel variance.

A calculation equation in step S40 is as follows:

$$V_{Area} = \frac{1}{r^2} \sum_{i \in Area} \sum_{j \in Area} (Img(i,j) - \text{Mean})^2$$

$$\text{Mean} = \frac{1}{r^2} \sum_{i \in Area} \sum_{j \in Area} Img(i,j)$$

when the pixel variance of the inner hole area, i.e., Varea, is larger than a product (Vsurr*k) of a pixel variance of the peripheral area and a coefficient k, it is determined that the inner hole area comprises the key information which is required for image processing; otherwise, an original image is maintained.

The peripheral area refers to an image region with a certain area around the inner hole area, and the pixel variance of the peripheral area is calculated by the same equation for calculating Varea. The pixel variance in step S10 is actually the pixel variance of the inner hole area in step S40.

Figure 4:
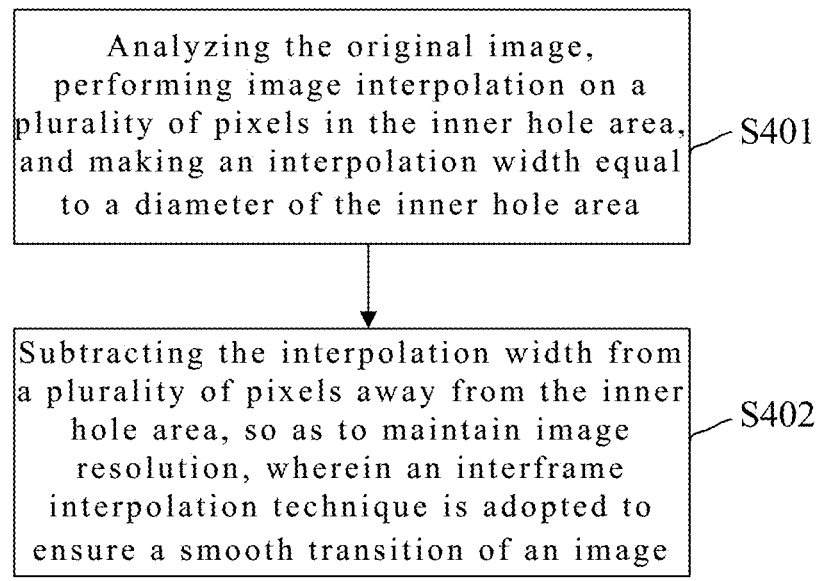
FIG. 4 is yet another process flow diagram illustrating the image processing method for the screen inner hole of the display device according to the present invention.

Also referring to FIG. 4, when the inner hole area comprises the key information which is required for image processing, the image processing comprises steps as follows:

S401: analyzing the original image, performing image interpolation on a plurality of pixels in the inner hole area, and making an interpolation width equal to a diameter of the inner hole area; and S402: subtracting the interpolation width from a plurality of pixels away from the inner hole area, so as to maintain image resolution, wherein an interframe interpolation technique is adopted to ensure a smooth transition of an image.

In step S401, the image interpolation is bilinear interpolation or Lanczos interpolation, which makes the image information more complete and enhances the harmony of a picture. The bilinear interpolation or the Lanczos interpolation are conventional techniques, so a detailed description thereof is not provided herein for brevity. In step S402, the interframe interpolation technique can effectively prevent the image processing from causing abrupt changes in the picture, and ensure smooth transition of the image.

In step S30, locating and determining a range of the inner hole area and a range of the peripheral area comprises inputting the i, j, and r, so that the range of the inner hole area and the range of the peripheral area are determined. In step S40, the inner hole area and the peripheral area are brought into the above calculation equation separately to calculate the pixel means and the pixel variations in the inner hole area and the peripheral area, wherein the Mean in the above calculation equation stands for the pixel means, and the coefficient k is a reasonable value greater than one and can be adjusted as needed.

Figure 5A:
FIG. 5A is a schematic view illustrating the image processing method for the screen inner hole of the display device according to one embodiment of the present invention.
Figure 5B:
FIG. 5B is a schematic view illustrating the image processing method for the screen inner hole of the display device according to another embodiment of the present invention.
Figure 5C:
FIG. 5C is a schematic view illustrating the image processing method for the screen inner hole of the display device according to still another embodiment of the present invention.

Referring to FIG. 5A, when image information of the inner hole area and image information of the peripheral area are the same, it is determined by the calculation equation that the inner hole area excludes the key information, and therefore the original image is maintained. As shown in FIGS. 5B and 5C, when the image information of the inner hole area and the image information of the peripheral area are different, it is determined by the calculation equation that the inner hole area comprises the key information, and therefore the image processing is performed on the key information.

Specifically, when the image information missing from the inner hole area is, for example, a portion of a sea, which is almost the same as the image information in the peripheral area, it is calculated by the above equation that there is no key information in the inner hole area. Therefore, the image, as shown in FIG. 5A, is not specially processed, that is, the original image is maintained. However, in FIG. 5B and FIG. 5C, because the image information missing from the inner hole area is greatly different from the image information of the peripheral area, so it is calculated by the above equation that an image shifting process needs to be performed on the image shown in FIG. 5B. The processed image is shown in FIG. 5C. Therefore, the image shown in FIG. 5C can display the key information normally without losing the key information, thereby making the displayed image more harmonious.

It should be noted that, the display device is a liquid crystal display (LCD) device, an organic light emitting diode (OLED) display device, or a white-light organic light-emitting diode (WOLED) display device. Furthermore, a front image sensor is disposed in the screen inner hole, and the front image sensor is a charge coupled device (CCD), a complementary metal oxide semiconductor (CMOS), and an infrared sensor (IR).

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. An image processing method for a screen inner hole of a display device, comprising steps as follows:

S10: determining coordinates (i, j) at a center and a radius r of the screen inner hole, and drawing a circle with the radius r to obtain a pixel range of an inner hole area, and calculating a pixel variance of the pixel range;

S20: analyzing an image configuration in the inner hole area and a peripheral area around the inner hole area, and determining whether key information is in the inner hole area;

S30: locating and determining a range of the inner hole area and a range of the peripheral area; and S40: separately calculating, in the inner hole area and in the peripheral area, a pixel mean and a pixel variance, and determining, by pixel values in the inner hole area and the peripheral area, whether the key information is in the inner hole area, wherein when the pixel variance of the inner hole area is larger than a product of a pixel variance of the peripheral area and a coefficient k, it is determined that the inner hole area comprises the key information which is required for image processing, and if it is determined that the inner hole area excludes the key information, an original image is maintained.

2. The image processing method for the screen inner hole of the display device according to claim 1, wherein a calculation equation in step S40 is as follows:

$$V_{Area} = \frac{1}{r^2} \sum_{i \in Area} \sum_{j \in Area} (Img(i, j) - \text{Mean})^2$$

$$\text{Mean} = \frac{1}{r^2} \sum_{i \in Area} \sum_{j \in Area} Img(i, j)$$

wherein the inner hole area and the peripheral area are brought into the above calculation equation separately to calculate the pixel means and the pixel variations in the inner hole area and the peripheral area, wherein the Mean in the above calculation equation stands for the pixel means.

3. The image processing method for the screen inner hole of the display device according to claim 1, wherein in step S40, the coefficient k is a value greater than one.

4. The image processing method for the screen inner hole of the display device according to claim 1, wherein in step S30, locating and determining a range of the inner hole area and a range of the peripheral area comprises inputting the i, j, and r.

5. The image processing method for the screen inner hole of the display device according to claim 1, wherein when the inner hole area comprises the key information which is required for image processing, the image processing comprises steps as follows:

S401: analyzing the original image, performing image interpolation on a plurality of pixels in the inner hole area, and making an interpolation width equal to a diameter of the inner hole area, wherein the image interpolation is bilinear interpolation or Lanczos interpolation; and S402: subtracting the interpolation width from a plurality of pixels away from the inner hole area, so as to maintain image resolution, wherein an interframe interpolation technique is adopted to ensure a smooth transition of an image.

6. The image processing method for the screen inner hole of the display device according to claim 1, wherein when image information of the inner hole area and image information of the peripheral area are the same, it is determined that the inner hole area excludes the key information, and therefore the original image is maintained; when the image information of the inner hole area and the image information of the peripheral area are different, it is determined that the inner hole area comprises the key information, and therefore the image processing is performed on the key information.

7. An image processing method for a screen inner hole of a display device, comprising steps as follows:

S10: determining coordinates (i, j) at a center and a radius r of the screen inner hole, and drawing a circle with the radius r to obtain a pixel range of an inner hole area, and calculating a pixel variance of the pixel range;

S20: analyzing an image configuration in the inner hole area and a peripheral area around the inner hole area, and determining whether key information is in the inner hole area;

S30: locating and determining a range of the inner hole area and a range of the peripheral area; and S40: determining, by pixel values in the inner hole area and the peripheral area, whether the key information is in the inner hole area, wherein when it is determined that the inner hole area comprises the key information, image processing is performed on the key information, and if it is determined that the inner hole area excludes the key information, an original image is maintained.

8. The image processing method for the screen inner hole of the display device according to claim 7, wherein step S40 further comprises separately calculating, in the inner hole region and the peripheral region, a pixel mean and a pixel variance, wherein the pixel values comprise the pixel means and the pixel variances, wherein when the pixel variance of the inner hole area is larger than the product of the pixel variance of the peripheral area and a coefficient k, it is determined that key information which is required for image processing is in the inner hole area, and if it is determined that the inner hole area excludes the key information, the original image is maintained.

9. The image processing method for the screen inner hole of the display device according to claim 8, wherein a calculation equation in step S40 is as follows:

$$V_{Area} = \frac{1}{r^2} \sum_{i \in Area} \sum_{j \in Area} (Img(i, j) - \text{Mean})^2$$

$$\text{Mean} = \frac{1}{r^2} \sum_{i \in Area} \sum_{j \in Area} Img(i, j)$$

wherein the inner hole area and the peripheral area are brought into the above calculation equation separately to calculate the pixel means and the pixel variations in the inner hole area and the peripheral area, wherein the Mean in the above calculation equation stands for the pixel means.

10. The image processing method for the screen inner hole of the display device according to claim 8, wherein in step S40, the coefficient k is a value greater than one.

11. The image processing method for the screen inner hole of the display device according to claim 7, wherein in step S30, locating and determining a range of the inner hole area and a range of the peripheral area comprises inputting the i, j, and r.

12. The image processing method for the screen inner hole of the display device according to claim 7, wherein when the inner hole area comprises the key information which is required for image processing, the image processing comprises steps as follows:

S401: analyzing the original image, performing image interpolation on a plurality of pixels in the inner hole area, and making an interpolation width equal to a diameter of the inner hole area; and S402: subtracting the interpolation width from a plurality of pixels away from the inner hole area, so as to maintain image resolution, wherein an interframe interpolation technique is adopted to ensure a smooth transition of an image.

13. The image processing method for the screen inner hole of the display device according to claim 12, wherein in step S401, the image interpolation is bilinear interpolation or Lanczos interpolation.

14. The image processing method for the screen inner hole of the display device according to claim 7, wherein when image information of the inner hole area and image information of the peripheral area are the same, it is determined that the inner hole area excludes the key information, and therefore the original image is maintained; when the image information of the inner hole area and the image information of the peripheral area are different, it is determined that the inner hole area comprises the key information, and therefore the image processing is performed on the key information.

15. The image processing method for the screen inner hole of the display device according to claim 7, wherein the display device is a liquid crystal display device, an organic light emitting diode display device, or a white-light organic light-emitting diode display device.

16. The image processing method for the screen inner hole of the display device according to claim 7, wherein a front image sensor is disposed in the screen inner hole, and the front image sensor is a charge coupled device, a complementary metal oxide semiconductor, and an infrared sensor.

\* \* \* \* \*